United States Patent
Sawayanagi et al.

(10) Patent No.: US 6,568,951 B2
(45) Date of Patent: May 27, 2003

(54) BRACKET INTERCONNECTION STRUCTURE FOR AUXILIARY COMPONENT

(75) Inventors: Masahiro Sawayanagi, Shizuoka-ken (JP); Goro Takahashi, Aichi-ken (JP); Isao Yoneyama, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/024,259

(22) Filed: Dec. 21, 2001

(65) Prior Publication Data

US 2002/0081898 A1 Jun. 27, 2002

(30) Foreign Application Priority Data

Dec. 25, 2000 (JP) .......................... 2000-392762

(51) Int. Cl.[7] ............................................. H01R 13/627
(52) U.S. Cl. ....................................................... 439/357
(58) Field of Search .......................... 439/357, 350–356, 439/358

(56) References Cited

U.S. PATENT DOCUMENTS

| | | | |
|---|---|---|---|
| 5,046,956 A | 9/1991 | Takano | |
| 5,462,448 A | * 10/1995 | Kida et al. ................... | 439/357 |
| 5,788,522 A | 8/1998 | Kameyama | |
| 5,893,768 A | 4/1999 | Gawron et al. | |
| 6,000,959 A | 12/1999 | Curtindale et al. | |
| 6,186,818 B1 | * 2/2001 | Hung .......................... | 439/357 |

* cited by examiner

Primary Examiner—Gary F. Paumen
(74) Attorney, Agent, or Firm—Finnegan, Henderson, Farabow, Garrett & Dunner, L.L.P.

(57) ABSTRACT

A first bracket has a first connector and a plurality of engagement members. The engagement members guide engagement protrusions mentioned later inside to engage with them. A second bracket has a second connector and a plurality of engagement protrusions to be fitted into the engagement members and having a height greater than that of the second connector. The second bracket supports an auxiliary component. During interconnection of the brackets, the engagement protrusions are inserted into the engagement members before the connectors are fitted to one another. The guiding and engagement of the engagement protrusions into and with the engagement members lead to fitting of the connectors to one another and interconnection of the brackets, resulting in the auxiliary component fixed to the first bracket.

5 Claims, 9 Drawing Sheets

BRACKET INTERCONNECTION STRUCTURE FOR AUXILIARY COMPONENT

BACKGROUND OF THE INVENTION

1. Field of the Invention

This invention relates to an interconnection structure in which two brackets are interconnected to fix an auxiliary component held by one bracket to the other bracket. More particularly, this invention relates to a structure for interconnection between a bracket having a connector for a sunvisor and a bracket having a connector for a wiring harness from a vehicle body.

2. Description of the Related Art

In a vehicle interior, sunvisors for a driver and a passenger seat occupant are provided above a front window. Some sorts of sunvisors are provided with vanity mirrors and/or illumination lamps for nighttime.

Figure 1:
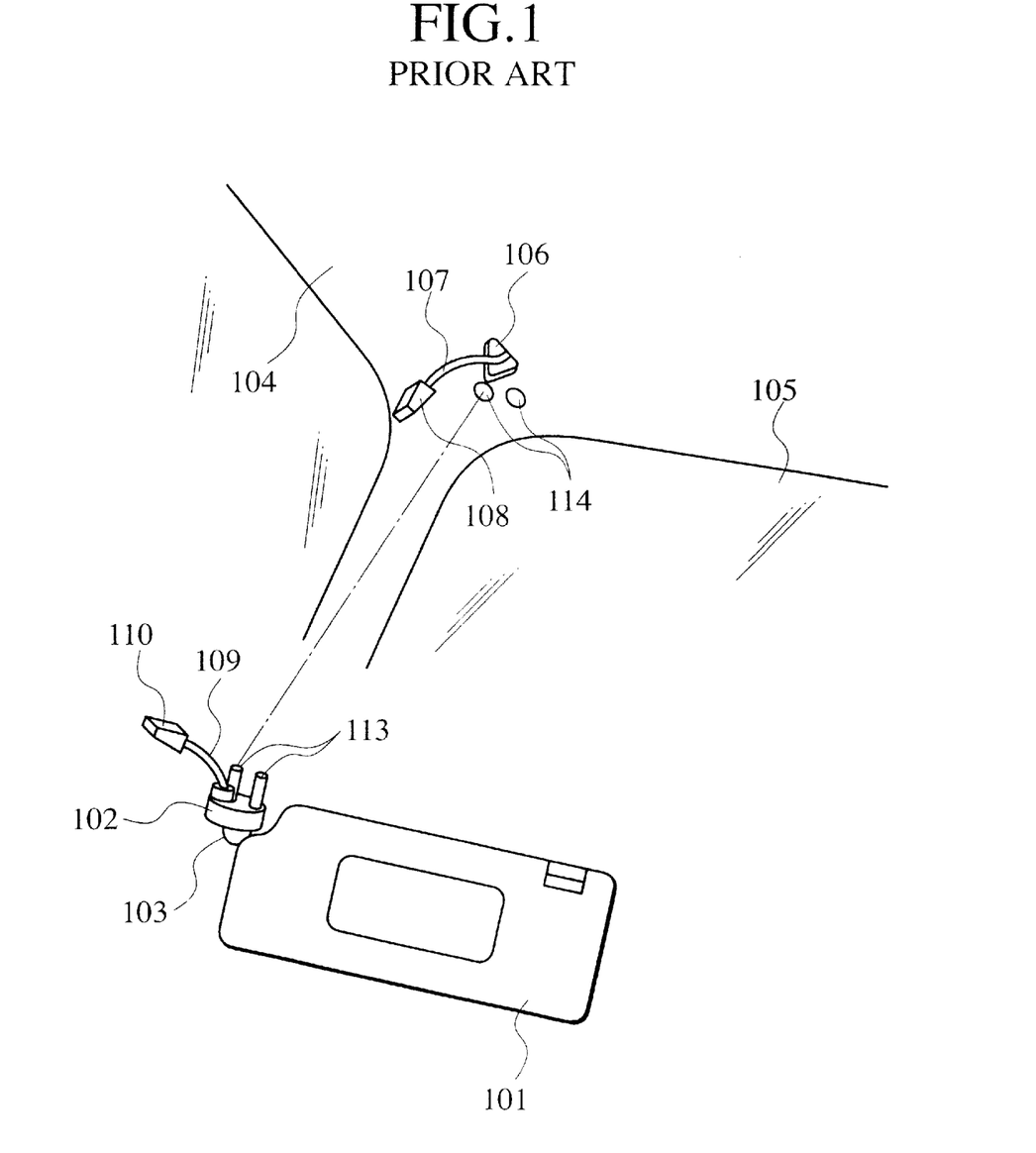
FIG. 1 shows a bracket and an inner panel according to a conventional connection structure.

FIG. 1 shows such a sunvisor with a lamp provided with a bracket at the distal end of a fixing shaft for fixing the sunvisor to the interior of a vehicle. The bracket is screwed to an inner panel in the vehicle interior.

With reference to FIGS. 1 to 4, a conventional connection structure for fixing a sunvisor to an inner panel will be described. An inner panel has a hole provided above a front window, through which a wiring harness is drawn out into the interior of a vehicle. A connector attached to the front end of the harness is mated with a connector attached to the front end of a wire drawn out from the bracket. The mating of those two connectors requires manual work by a skilled person.

Figure 2:
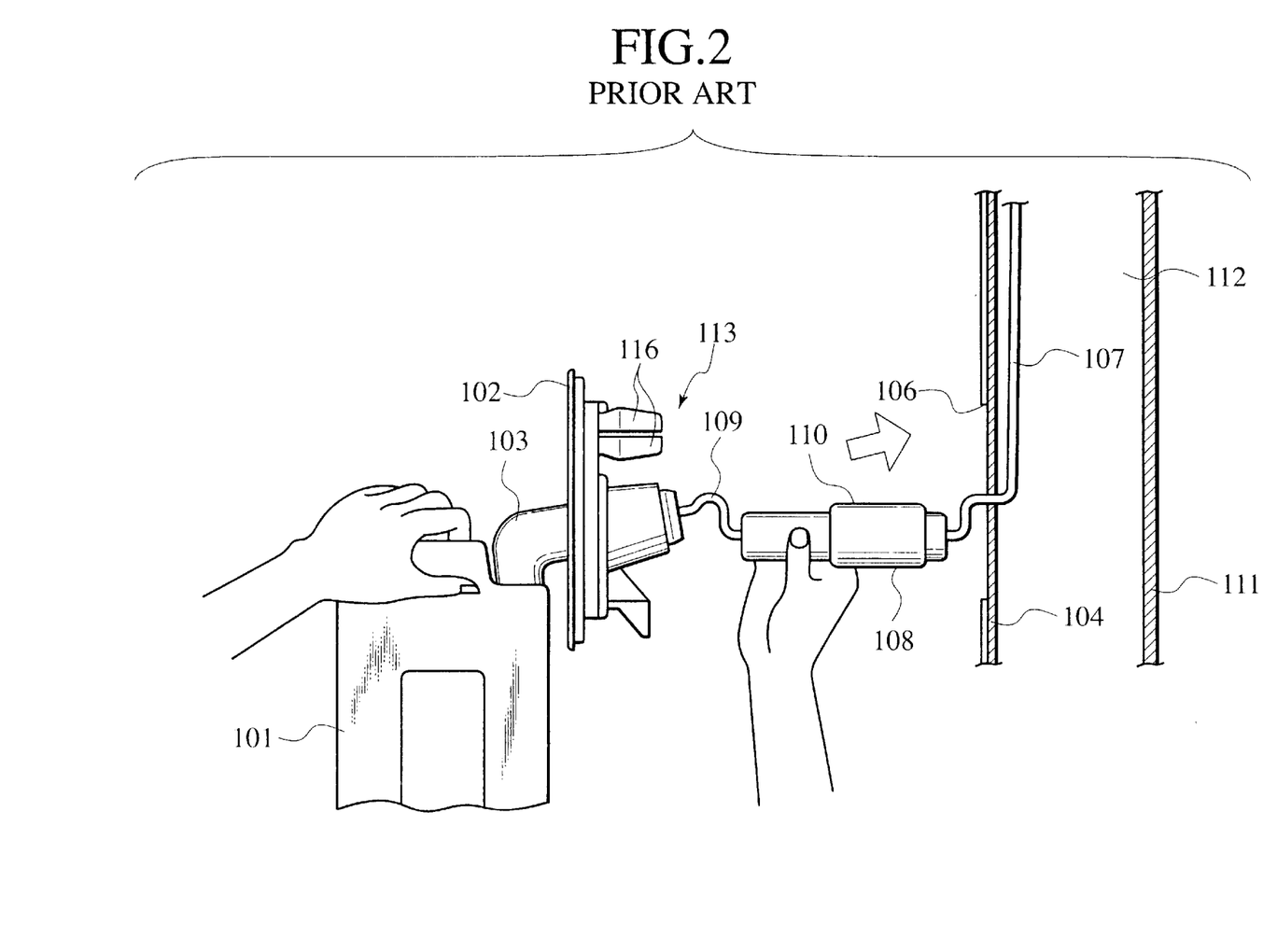
FIG. 2 is a cross-sectional view illustrating a step of connecting the bracket to the inner panel according to the conventional connection structure.
Figure 3:
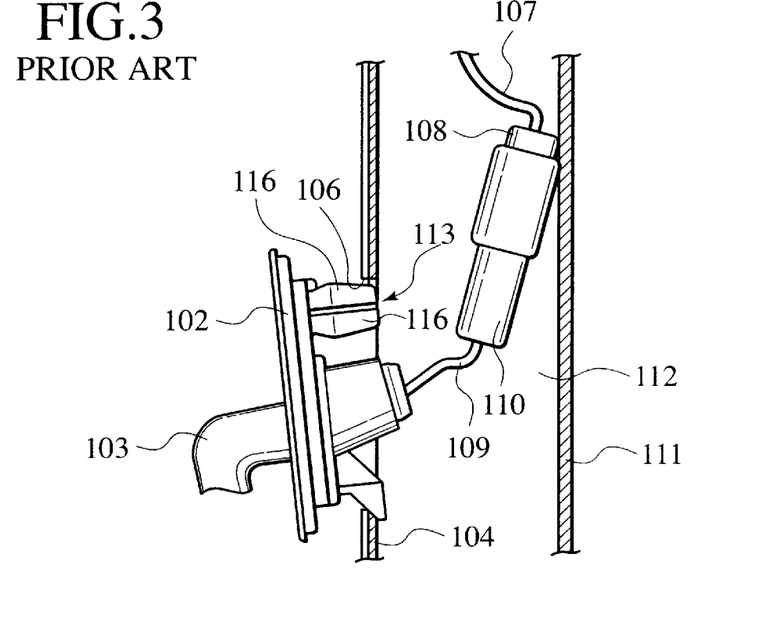
FIG. 3 is a cross-sectional view illustrating a step of connecting the bracket to the inner panel according to the conventional connection structure.

Then, as shown in FIG. 2, the mated connectors and the wiring harness are inserted through the hole formed in the inner panel into a space between the inner panel and an outer panel so as to mount the sunvisor. Specifically, as shown in FIG. 3, with the mated connectors and the harness accommodated in the space, a grommet screw formed in the bracket is inserted into a bracket mounting hole formed in the inner panel as shown in FIG. 3, thereby to push the bracket into the inner panel.

Figure 4:
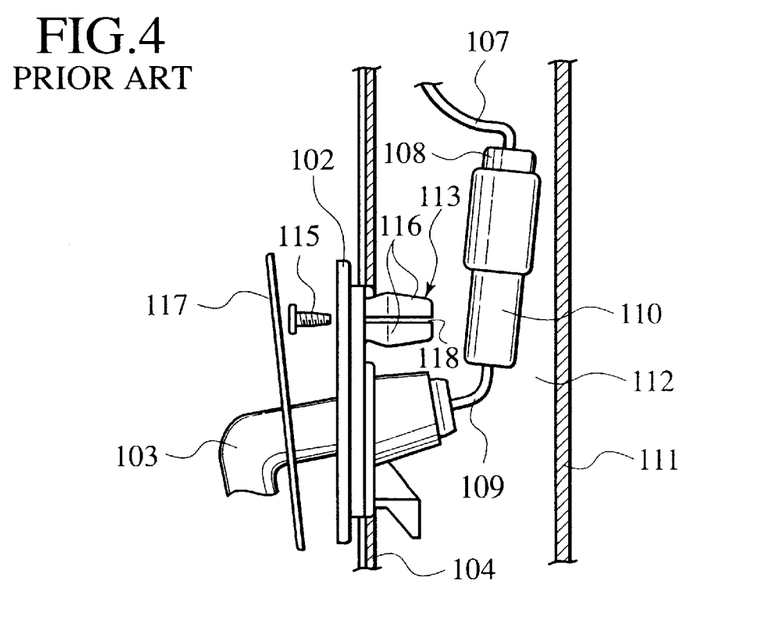
FIG. 4 is a cross-sectional view illustrating a step of connecting the bracket to the inner panel according to the conventional connection structure.

Then, as shown in FIG. 4, a screw is inserted into a central hole of the grommet screw in a cylindrical shape for fastening. The grommet screw has slits at the front end so that it is pushed and expanded by the screw inserted. A plurality of expanded portions of the grommet screw is pressed against an opening periphery of the bracket mounting hole, whereby the bracket is fixed to the inner panel.

SUMMARY OF THE INVENTION

In the above conventional fixing structure, however, it can inadvertently occur that the sunvisor is fixed to the inner panel with incomplete engagement between the connector for the wiring harness and the connector for the sunvisor unnoted. Further, it is necessary to confirm that connection terminals not shown are properly fitted into the respective connectors. Incomplete fitting of the terminals prevents power supply to the lamp. If that is the case, all parts mounted should be demounted and checked to repeat a series of mounting steps. This significantly reduces work efficiency.

The conventional fixing structure further requires a guiding structure for each connector to facilitate mating of the connectors. Thus the connectors cannot be disadvantageously made smaller. Furthermore, it is necessary to form hoods of the connectors with relatively large thickness to give enough strength to the connectors for secure fixation therebetween. In short, the conventional fixing structure prevents reduction in size and weight of connectors, and thus preventing reduction in cost.

It is an object of this invention to provide a bracket interconnection structure which enables reduction in size and weight of connectors and provides reliable engagement between the connectors.

According to a first aspect of this invention, there is provided a bracket interconnection structure for an auxiliary component, which comprises a first bracket comprising a first connector and a plurality of engagement members, and a second bracket comprising a second connector and a plurality of engagement protrusions fitted into the engagement members and having a height greater than that of the second connector. The engagement members guide the engagement protrusions inside to engage with them, whereby the first connector and the second connector are fitted to one another, and thus the first bracket and the second bracket are connected to one another. As a result, the auxiliary component supported by the second bracket is fixed to an object to which the first bracket is fixed.

In the above structure, in the interconnecting operation of the first and second brackets, the engagement protrusions on the second bracket are guided and inserted into the engagement parts before the second connector is fitted into the first connector because of their greater height than that of the second connector. This prevents wires led out from the auxiliary component to the second bracket or the second connector from contacting the first bracket during the connecting operation. The wires led out from the auxiliary component and the second connector are thus prevented from being damaged. Further, since the engagement members guide the engagement protrusions, thereby to appropriately position the both brackets for connection, the connectors can be fitted to one another without receiving undue force. This eliminates the need for producing the connectors with great strength, allowing the connectors to be reduced in size, and thus allowing the brackets to be reduced in weight.

According to a second aspect of this invention, the engagement protrusions have upper portions formed in a circular cone shape or a quadrangular prism shape with diameters gradually reduced to the top ends, and the engagement members are in a tubular shape. When the engagement protrusions are inserted into the engagement members, the front portions with reduced diameters of the protrusions guide the protrusions to their normal positions. This eliminates the need for providing guiding mechanism to the first and second connectors, resulting in a simplified connecting structure.

According to a third aspect of this invention, the engagement members have respective locking arms, and the engagement protrusions have respective grooves, the locking arms being engaged with the respective grooves.

The engagement of the locking arms with the grooves makes the brackets in a preliminarily fixed state. The brackets can thus be retained in the interconnected state before being further fixed with grommet screws or the like, for example.

DETAILED DESCRIPTION OF THE PREFERRED EMBODIMENT

A preferred embodiment of this invention will be described below with reference to FIGS. 5 to 12. In this embodiment, the invention is applied to a bracket interconnection structure for fixing a sunvisor as an auxiliary component to an inner panel fixed above a front window in front of a driver seat or a passenger seat.

Figure 5:
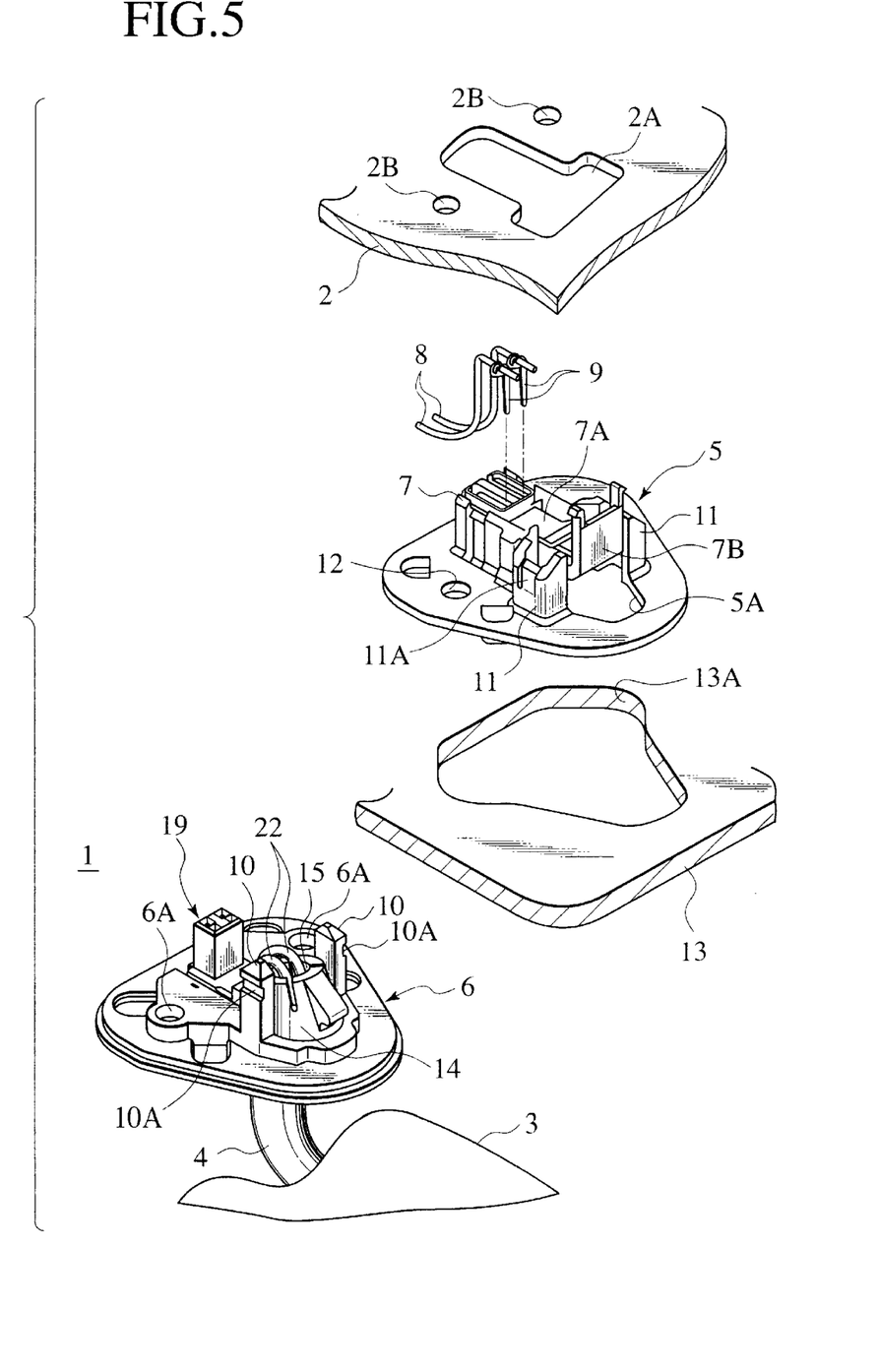
FIG. 5 is an exploded perspective view illustrating a bracket interconnection structure for an auxiliary component according to an embodiment of this invention.

As shown in FIG. 5, a bracket 1 to be mounted to a vehicle body according to the embodiment is a device for fixing a sunvisor 3 to an inner panel 2 of a vehicle, attached to the front end of a fixing shaft 4 supporting the sunvisor 3. The bracket 1 includes a first bracket 5 and a second bracket 6.

First Bracket

The first bracket 5 to be mounted to the inner panel of the vehicle is provided with a first connector 7 as shown in FIG. 5. The first connector 7 is formed in an upwardly protruding manner on the first bracket 5 and is provided at its bottom with a connection opening (not shown) for receiving a second connector 19 to be described later. A first connection terminal 9 fitted onto an end of a wiring harness 8 from a vehicle body as shown in FIG. 5 is housed and fixed in the first connector 7. A cover 7B is attached to the first connector 7 via a hinge 7A. With the cover 7B put over the first connector 7 for engagement, the first terminal 9 is retained inside.

The first bracket 5 is further provided with a pair of tubular engagement members 11 for engagement with a pair of engagement protrusions 10 provided to a second bracket 6 described later. Each engagement member 11 has at its bottom an opening for receiving the engagement protrusion 10. An insertion hole 5A for insertion of a shaft holding member 14 of the second bracket 6 to be described later is provided between the engagement members 11.

Each engagement member 11 has a flexible locking arm 11A. The first bracket 5 is further provided with a pair of mounting holes 12 for insertion of grommet screws not shown.

Inner Panel

The first bracket 5 is fixed to the inner panel 2. The inner panel 2 has an opening 2A provided for insertion of the protruded first connector 7 and the pair of engagement members 11. The inner panel 2 further has a pair of mounting holes 2B positioned correspondingly to the mounting holes 12 of the first bracket 5.

Second Bracket

The second bracket 6 is, as shown in FIG. 5, fixed to the first bracket 5 with a trim 13 to be fixed to the inner panel 2 for interior decoration interposed therebetween. The second bracket 6 has the shaft holding member 14 for holding the front end of the fixing shaft 4. The shaft holding member 14 has in the center a substantially cylindrical shaft holding hole 15 for receiving the fixing shaft 4.

Figure 6:
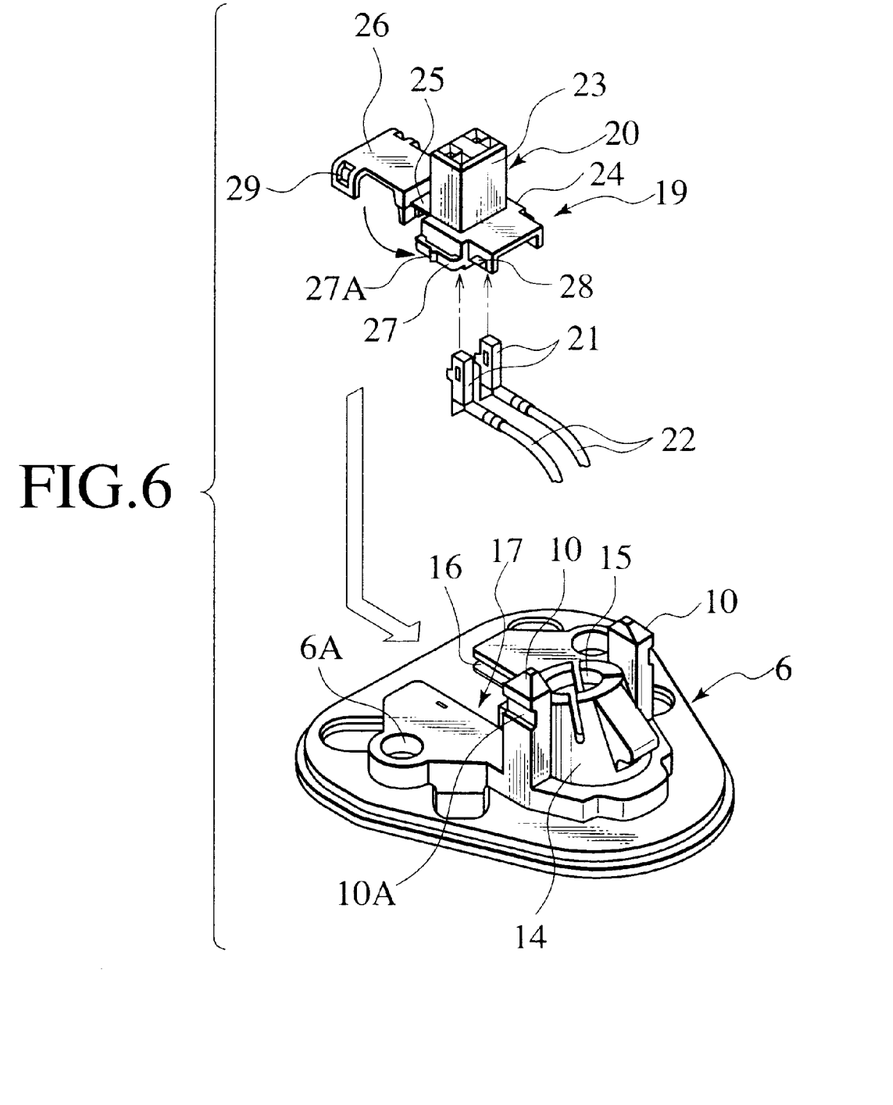
FIG. 6 is an exploded perspective view illustrating a second bracket and a second connector according to the embodiment of this invention.
Figure 7:
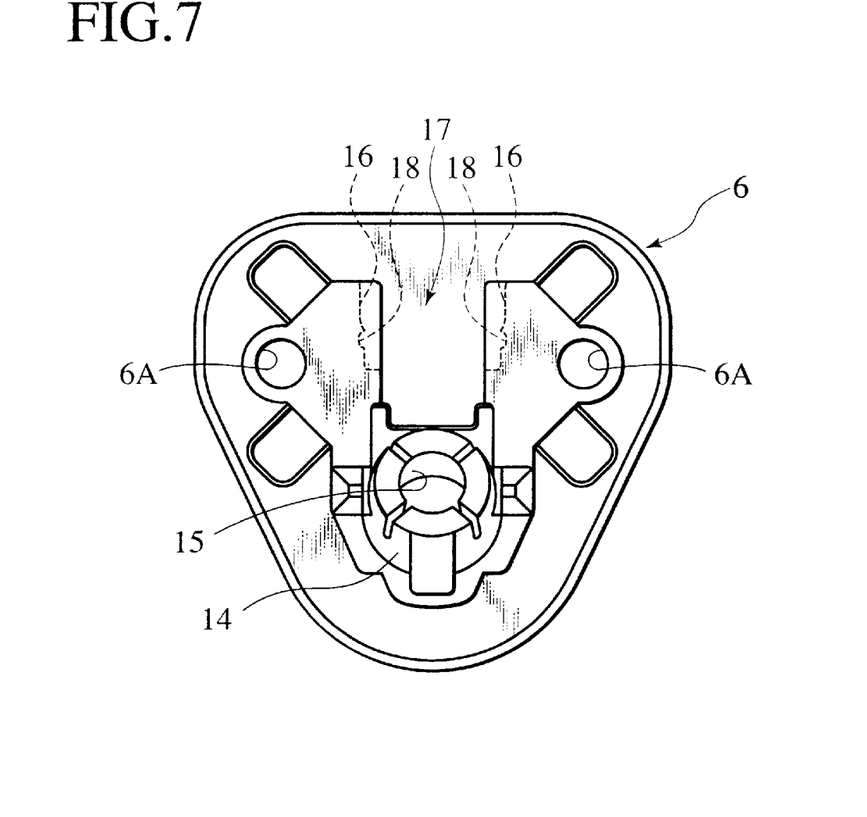
FIG. 7 is a plan view of the second bracket according to the embodiment of this invention.

The second bracket 6 has, as shown in FIGS. 6 and 7, a connector fixing section 17 with two opposite slots 16 extending in a parallel relationship in the plane direction of the bracket. Each slot 16 has a locking recess 18 formed in the middle. The second connector 19 is slid laterally into the fixing section 17 as shown in FIG. 5.

The two engagement protrusions 10 are formed in an upwardly protruding manner on opposite sides of the shaft holding member 14. The protrusions 10 extend to a higher level than the second connector 19. Thus, in connecting the second bracket 6 to the first bracket 5, the engagement protrusions 10 are inserted into the respective engagement members 11 of the first bracket 5 before the second connector 19 is fitted into the first connector 7. Each engagement protrusion 10 is formed with a groove 10A in an upper side surface for engagement with a free end of the locking arm 11A. The upper portion of the engagement protrusion 10 is in a quadrangular prism or circular cone shape. The upper portion in such a shape guides the protrusion 10 into the engagement member 11 during insertion. This allows reliable connecting operation of the first and second brackets 5 and 6.

The second bracket 6 also has a mounting hole 6A provided on each side of the inserted position of the second connector 19. The mounting hole 6A corresponds in position to the mounting hole 12 of the first bracket 5 and the mounting hole 2B of the inner panel 2.

Second Connector

The second connector 19 has, as shown in FIG. 6, a connector housing 20 and a pair of second connection terminals 21 housed in the housing 20. The second terminals 21 are connected to ends of a pair of wires 22 from the sunvisor, led out from the end of the fixing shaft 4 inserted into the shaft holding member 14 of the second bracket 6.

The connector housing 20 consists, as shown in FIG. 6 and FIGS. 8 to 10, of an upper member 24 as a body having a second connector hood 23 for insertion of the second terminals 21 from the bottom, and a lower member 26 attached to the upper member 24 via a hinge 25. The lower member 26 is turned on the hinge 25 to cover the bottom of the upper member 24.

Figure 8:
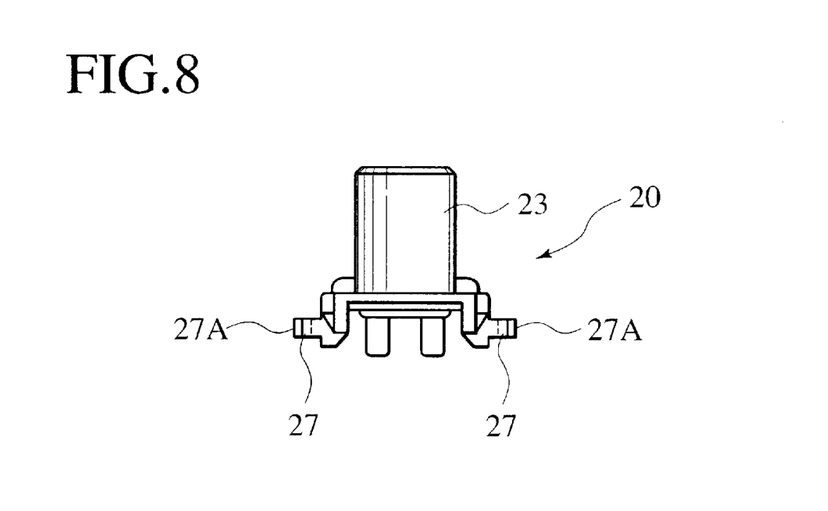
FIG. 8 is a front view of a connector housing of the second connector according to the embodiment of this invention.
Figure 9:
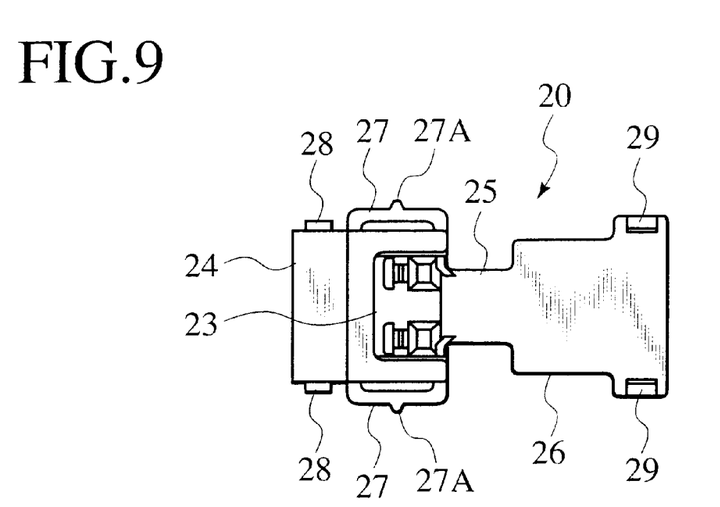
FIG. 9 is a plan view of the connector housing of the second connector according to the embodiment of this invention.
Figure 10:
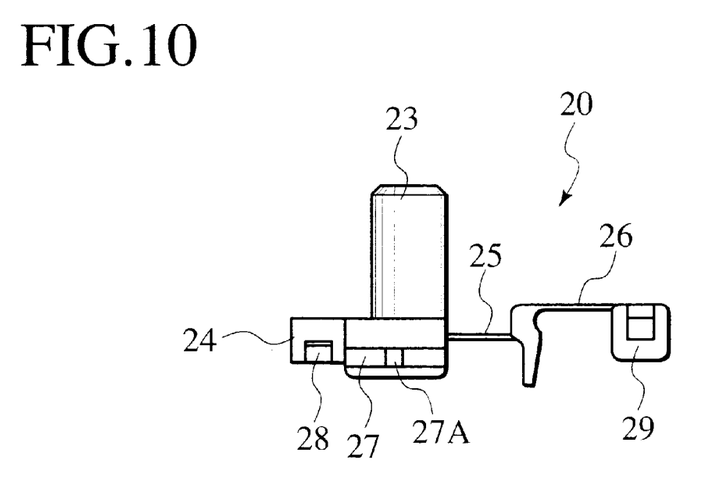
FIG. 10 is a side view of the connector housing of the second connector according to the embodiment of this invention.

The upper member 24 has, at its opposed sidewalls, a pair of rails 27 to be inserted into the slots 16 of the second bracket 6. Each rail 27 is a flexible arm and is fixed at the opposite ends to the sidewall of the upper member 24. A locking protrusion 27A extending laterally outward of the upper member 24 is formed substantially in the middle of each rail 27.

The upper member 24 also has, at its opposite sidewalls, engagement protrusions 28. The lower member 26 has engagement parts 29 positioned correspondingly to the engagement protrusions 28. The engagement parts 29 engage with the respective engagement protrusions 28 when the lower member 26 is turned on the hinge 25 to be laid on the bottom of the upper member 24.

Effects

In the connector housing 20 of the above-described structure, the second connection terminals 21 are inserted from below and held in the connector hood 23, and the lower member 26 is turned on the hinge 25 onto the upper member 24 so as to engage the engagement parts 29 with the engagement protrusions 28, whereby the second terminals 21 are guided to and fixed in the appropriate positions inside the connector hood 23.

With the upper member 24 and the lower member 26 engaged with one another, the rails 27 are inserted into the slots 16 of the second bracket 6. That is, the connector housing 20 cannot be fixed to the second bracket 6 until the second terminals 21 are housed appropriately in the connector hood 23. Once the second connector 19 is fixed to the second bracket 6, the lower member 26 never opens, which eliminates the possibility of erroneous pulling out of the second terminals 21 or disengagement of the lower member 26.

Figure 11:
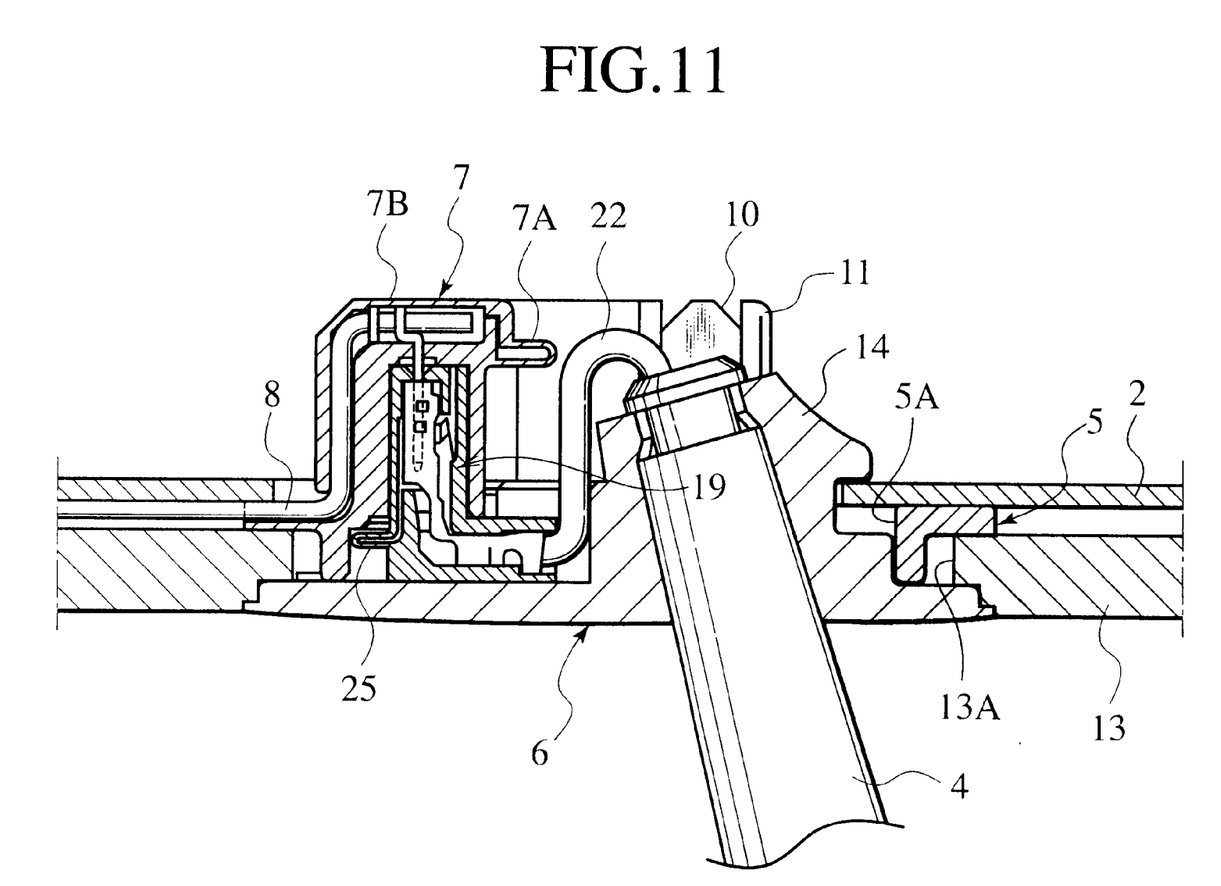
FIG. 11 is a cross-sectional view illustrating an interconnected state of a first bracket and the second bracket according to the embodiment of this invention.
Figure 12:
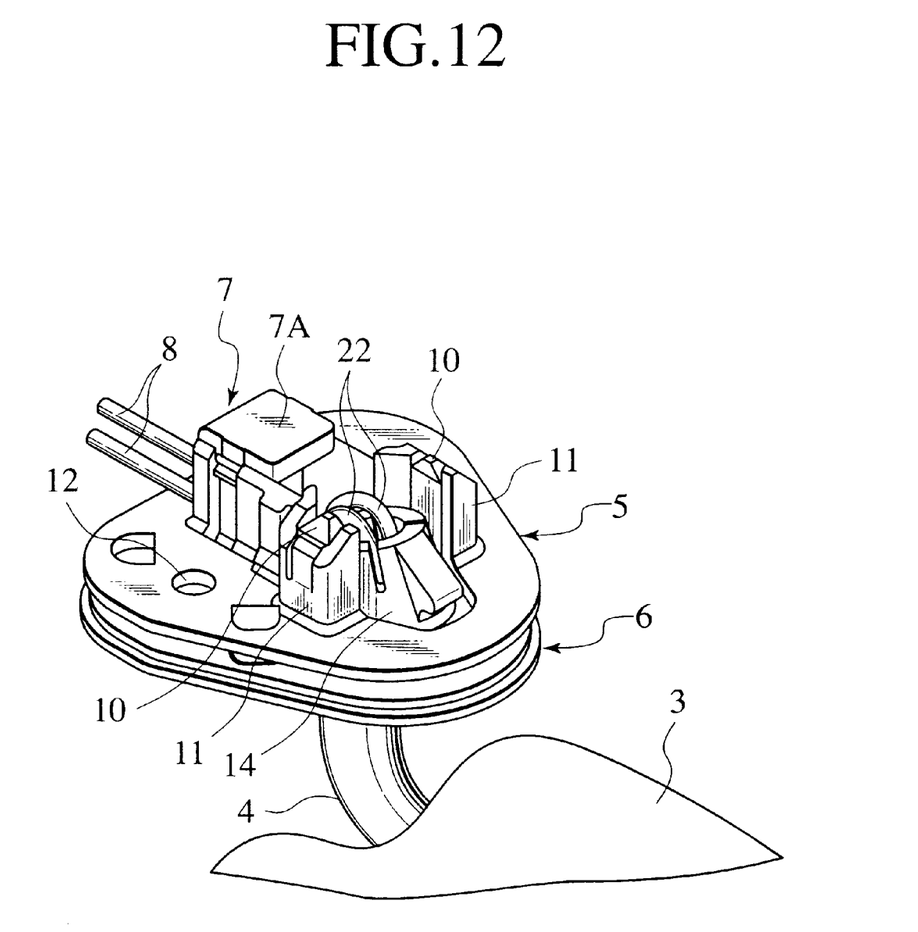
FIG. 12 is a perspective view illustrating the interconnected state of the first bracket and the second bracket with an inner panel and a trim omitted, according to the embodiment of this invention.

In the course of fitting the second bracket 6 to the first bracket 5, the first bracket 5 is interposed between the inner panel 2 and the trim 13 with the first connector 7 and the engagement parts 11 protruded outside of the opening 2A of the inner panel 2, and the second connector 19, the engagement protrusions 10 and the shaft holding member 14 on the second bracket 6 are opposed through an opening 13A of the trim 13 to the first bracket 5 for assemblage. Since the upper portion of the engagement protrusion 10 is in a quadrangular prism shape, the protrusion 10 is appropriately guided into the opening provided at the bottom of the engagement member 11 of the first bracket 5, and is fitted into the member 11.

With a greater height than that of the second connector 19, the engagement protrusions 10 are inserted into the respective engagement members 11 of the first bracket 5 before the second connector 19 is fitted into the first connector 7 in the course of connecting the second bracket 6 to the first bracket 5. The top ends of the locking arms 11A of the engagement members 11 are engaged with the grooves 10A formed in the side surfaces of the engagement protrusions 10, thereby bringing the brackets 5 and 6 into preliminary engagement.

Finally, a bracket case not shown is attached from below the second bracket 6, completing the fixing of the sunvisor 3 as an auxiliary component to the inner panel 2. The bracket case has screw grommets to be inserted into the mounting holes 6A, 12 and 2B.

The preferred embodiment of this invention has been described above, which is not intended to limit this invention to the above embodiment. The above disclosure enables those of ordinary skill in the art to perform this invention through modifications or variations of the embodiment. For example, this invention can be applied to a device such as a room lamp as well as a sunvisor as illustrated in the above embodiment.

What is claimed is:

1. A bracket interconnection structure for an auxiliary component, comprising:

a first bracket comprising:
     a first connector including a first connection terminal; and
     a plurality of engagement members formed separately from the first connection terminal; and a second bracket supporting the auxiliary component, comprising:
     a second connector including a second connection terminal; and
     a plurality of engagement protrusions formed separately from and spaced from the second connection terminal and configured to be fitted into the engagement members, the engagement protrusions being greater in height than the second connector, wherein the engagement protrusions are guided into the engagement members to be engaged so as to fit the second connector and the first connector together, connecting the second bracket to the first bracket, whereby the auxiliary component is fixed to the first bracket; and the engagement members have locking arms, and the engagement protrusions have grooves configured to be engaged with the locking arms when the engagement members and the engagement protrusions are engaged.

2. A bracket interconnection structure for an auxiliary component according to claim 1, wherein:

the engagement protrusions have upper portions formed in a circular cone shape or a quadrangular prism shape, and the engagement members are in a tubular shape.

3. A bracket interconnection structure for an auxiliary component according to claim 1, wherein:

the first bracket further comprises a cover attached to the first connector via a hinge, and the cover, by being turned on the hinge, is configured to be put over the first connector to retain the first connection terminal inside the first connector.

4. A bracket interconnection structure for an auxiliary component according to claim 1, wherein:

the second connector further includes an upper member having a connector hood and a lower member attached to the upper member via a hinge, and the lower member, by being turned on the hinge, is configured to cover the upper member to fix the second connection terminal inside the connector hood.

5. A bracket interconnection structure for an auxiliary component according to claim 1, wherein:

the second bracket further comprises a connector fixing section including slots, and the second connector includes rails configured to be slid into the slots to fix the second connector to the connector fixing section.

* * * * *